United States Patent
Yoshimoto et al.

(10) Patent No.: US 7,450,856 B2
(45) Date of Patent: Nov. 11, 2008

(54) DISPERSION COMPENSATING METHOD AND DISPERSION COMPENSATING APPARATUS

(75) Inventors: Masahiro Yoshimoto, Kawasaki (JP); Makoto Takakuwa, Kawasaki (JP); Futoshi Izumi, Kawasaki (JP); Takahiro Hosokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 464 days.

(21) Appl. No.: 10/885,732

(22) Filed: Jul. 8, 2004

(65) Prior Publication Data

US 2005/0213986 A1   Sep. 29, 2005

(30) Foreign Application Priority Data

Mar. 26, 2004   (JP)   ............... 2004-093079

(51) Int. Cl.
  *H04B 10/00* (2006.01)
  *H04B 10/12* (2006.01)
  *H04B 10/06* (2006.01)
(52) U.S. Cl. ............... 398/159; 398/147; 398/209
(58) Field of Classification Search ............... 398/81, 398/147–150, 159, 208, 209
See application file for complete search history.

(56) References Cited

U.S. PATENT DOCUMENTS

| 6,307,988 | B1 | 10/2001 | Eggleton et al. |
| 6,370,300 | B1 | 4/2002 | Eggleton et al. |
| 7,062,165 | B2 * | 6/2006 | Brissette et al. ............... 398/27 |
| 2002/0048062 | A1 * | 4/2002 | Sakamoto et al. ........... 359/124 |
| 2002/0089724 | A1 * | 7/2002 | Nishimoto et al. .......... 359/161 |
| 2002/0149812 | A1 * | 10/2002 | Hong et al. ................. 359/110 |
| 2003/0163771 | A1 | 8/2003 | Tomofuji |

FOREIGN PATENT DOCUMENTS

| EP | 1 223 694 | 7/2002 |
| EP | 1 324 555 | 7/2003 |
| JP | 99/48231 | 9/1999 |
| JP | 2000-244394 | 9/2000 |
| JP | 2002-208892 | 7/2002 |
| JP | 2003-046443 | 2/2003 |
| WO | WO 03/065622 | 8/2003 |

OTHER PUBLICATIONS

European Search Report, mailed Jan. 10, 2008 and issued in corresponding European Patent Application No. 04016111.9-1246.

* cited by examiner

*Primary Examiner*—Jason Chan
*Assistant Examiner*—Nathan M Curs
(74) *Attorney, Agent, or Firm*—Staas & Halsey LLP

(57) ABSTRACT

A dispersion compensating method for compensating wavelength dispersion occurring in an optical transmission line, includes the steps of: a) performing dispersion compensation by causing an optical signal, supplied from the transmission line, to pass through a variable dispersion compensator; and b) controlling a dispersion compensating amount in the variable dispersion compensator according to code error information corresponding to a type of code in a received data signal obtained from receiving the optical signal having undergone the dispersion compensation.

8 Claims, 16 Drawing Sheets

DISPERSION COMPENSATING METHOD AND DISPERSION COMPENSATING APPARATUS

BACKGROUND OF THE INVENTION

1. Field of the Invention

The present invention relates to a dispersion compensating method and a dispersion compensating apparatus, and, in particular, to a dispersion compensating method and a dispersion compensating apparatus for automatically compensating wavelength dispersion occurring in an optical fiber in a wavelength division multiplexing transmission system.

2. Description of the Related Art

Recently, a transmission rate in an optical transmission system increases from 2.4 Gbps to 10 Gbps, and, in such a situation, importance of dispersion compensation increases accordingly.

In a wavelength division multiplexing (WDM) transmission system, there are two methods of dispersion compensation, i.e., a method in which dispersion compensation is performed for each wavelength and another method in which dispersion compensation is performed for all the wavelengths in a lump. The first method in which dispersion compensation is performed for each wavelength requires the costs greatly higher than those required for the second method in which dispersion compensation is performed for all the wavelengths in a lump. On the other hand, since dispersion slope in a transmission line depends on each particular optical fiber transmission line, it is not possible to completely compensate transmission line dispersion for all the wavelengths in the second method of performing dispersion compensation in a lump of all the wavelengths. In order to solve this problem, a method of dividing a target wavelength band and performing dispersion compensation for each of the division wavelength bands exists.

In many cases, the above-mentioned second method of performing dispersion compensation in a lump is applied in terms of the costs required. However, in any method, a dispersion compensator may be used there is such that an optical fiber such as a dispersion compensated fiber (DCF) as a typical example is cut for a length according to a dispersion amount, and is disposed according to a transmission line dispersion amount for each repeating section, so as to be used for the dispersion compensation.

In contrast thereto, recently, a variable dispersion compensator has been put into practical use, and, it is expected that such an apparatus will spread sharply. It is known that, in order to control the variable compensator, an optimum dispersion amount is set with the use of code error information such as error correction amount as disclosed by Japanese Laid-open Patent Application No. 2002-208892.

Other than it, Japanese Laid-open Patent Application No. 2003-46443 discloses an art of detecting a duty ratio of an optical signal, and controlling a dispersion compensation amount in the variable compensator based on the duty ratio.

Further, Japanese Laid-open Patent Application No. 2000-244394 discloses an art of detecting maintainability in data transmitted, generating an electric feedback signal for controlling a current applied to a grating, and determining dispersion in the grating.

International Publication No. WO99/048231 discloses an art of giving perturbation to wavelength dispersion in a transmission line, counting and comparing errors occurring when the perturbation is given in each direction, and changing the center of the perturbation in a direction such that the errors may be reduced.

SUMMARY OF THE INVENTION

In a case where an optimum dispersion compensating amount is sought with the use of code error information in dispersion compensating control in such a variable dispersion compensator, it may not be easy to determine which direction the dispersion compensating amount should be controlled in when the dispersion in the transmission line changes.

In other words, there may be a case where the dispersion compensating amount should be controlled in a case where the transmission line dispersion fluctuates due to influence of ambient temperature or such. However, when the dispersion compensating amount is controlled only according to a code error amount, it is necessary to determine a direction of correction (i.e., a direction in which the code error amount decreases) by changing the dispersion amount in one direction of increasing or decreasing on a trial basis so as to detect whether the code error amount increases or decreases as a result.

Conventionally, as shown in FIG. 1, the optimization is performed in such a manner in which, the dispersion compensating amount is changed in a fixed range to a residual dispersion amount A or B from a current residual dispersion amount O, and thus, a point at which BER (bit error rate) becomes minimum is sought. However, in this method, when the dispersion compensating amount shifts from the optimum value, a dangerous situation may occur in which the BER may be increased temporarily before finally determining whether the dispersion compensating amount should be increased or decreased. For example, in an optical transmission system having an error correction function, it is necessary to provide an extra margin such that the BER even in a case where the dispersion compensating amount is changed so as to be not able to avoid temporarily increasing the error correction amount may not exceed an error correctable limit in the error correction function, as shown in FIG. 2.

Furthermore, in a case where control of the dispersion compensating amount is performed only with the use of the error correction amount, there is a possibility of dangerousness in which the dispersion compensating amount is erroneously set such that the error correction amount may rather further increase finally, when the error correction amount once increases due to a reason such as unexpected burst error, degradation in an OSNR (optical signal noise ratio) or such, other than a reason of change in the dispersion amount itself. For example, as shown in FIG. 3, a situation is assumed in which originally the dispersion compensation control is performed for the optimum residual dispersion amount O in the BER curve indicated by a solid line in a normal condition, and then, an unexpected degradation in the OSNR occurs such that the BER curve temporarily shifts as indicated by a broken line. In such a situation, the dispersion compensating amount control is performed with the use of the given error correction amount so that a residual dispersion amount A may be set in the control. Then, when the degradation in the OSNR is eliminated, the dispersion compensating amount control should be performed again for the optimum residual dispersion amount O.

Furthermore, in a common optical transmission system, a design is made such that a sufficient error resistant margin is provided, and thus, automatic dispersion compensating amount control with the use of a given error correction amount may not be effectively performed since there occurs no error or merely a slight error correction amount is detected normally around the optimum residual dispersion amount O.

The present invention has been devised in consideration of the above-mentioned problems, and, an object of the present invention is to provide a dispersion compensating method and a dispersion compensating apparatus by which it is possible to determine a direction of increasing or decreasing the dispersion compensating amount without a need of a possibility of actually increasing the BER.

According to the present invention, a dispersion compensating method for compensating wavelength dispersion occurring in an optical transmission line, includes the steps of: a) performing dispersion compensation by causing an optical signal, supplied from the transmission line, to pass through a variable dispersion compensator; and b) controlling a dispersion compensating amount in the variable dispersion compensator according to code error information for a type of code in a received data signal obtained from receiving the optical signal having undergone the dispersion compensation.

According to another aspect of the present invention, a dispersion compensating method for compensating wavelength dispersion occurring in an optical transmission line, includes the steps of: a) performing dispersion compensation by causing an optical signal, supplied from the transmission line, to pass through a variable dispersion compensator; and b) controlling a dispersion compensating amount in the variable dispersion compensator according to code error information comprising a code error rate and the number of errors for each type of code in a received data signal obtained from receiving the optical signal having undergone the dispersion compensation.

According to another aspect of the present invention, a dispersion compensating apparatus for compensating wavelength dispersion occurring in an optical transmission line, includes: a variable dispersion compensating part performing dispersion compensation by causing an optical signal, supplied from the transmission line, to pass through a variable dispersion compensator; a light receiving part receiving an optical signal having undergone dispersion compensation and obtaining a received data signal therefrom; an error correcting part performing error correction on the received data signal obtained by the light receiving part and obtaining code error information for a type of corrected code; and a control part controlling a dispersion compensating amount in the variable dispersion compensating part according to the code error information obtained by the error correcting part.

In the above-mentioned configuration, the control part may control the dispersion compensating amount in the variable dispersion compensating part according to the code error information and an S/N ratio of the optical signal in the light receiving part.

Further, the code error information may include the number of corrected bits from 0 to 1 and the number of corrected bits from 1 to 0; and the control part may increase or decrease the dispersion compensating amount according to a correction ratio from 0 to 1, which is a ratio of the number of corrected bits from 0 to 1 with respect to the sum total of the number of corrected bits from 0 to 1 and the number of corrected bits from 1 to 0.

By the above-described configuration, it is possible to determine a direction of increasing or decreasing the dispersion compensating amount without a need of taking a risk of actually increasing the BER.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

With reference to the drawings, embodiments of the present invention will now be described.

Figure 1:
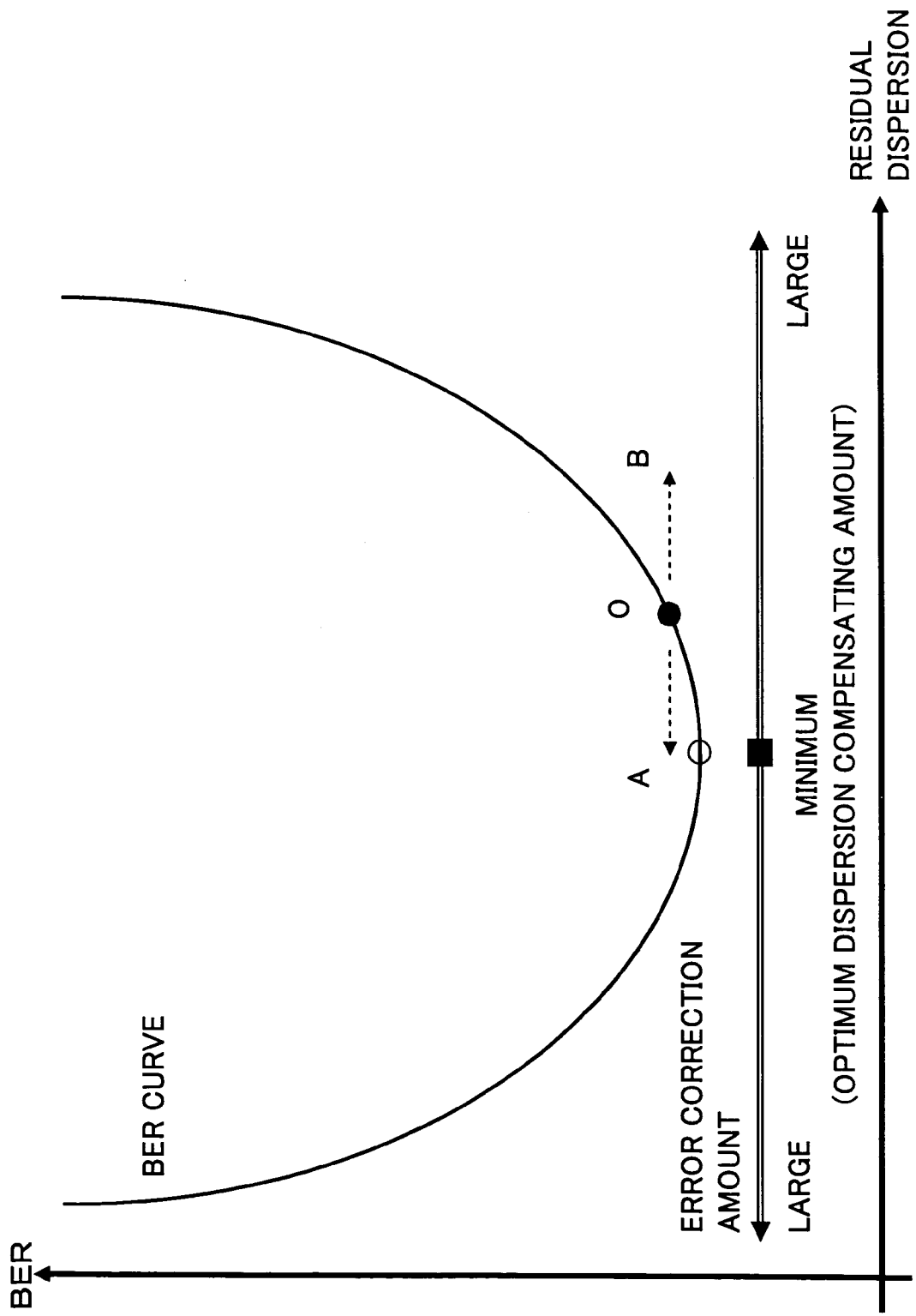
FIGS. 1 through 3 illustrate examples of dispersion compensating amount control according to the related art.
Figure 2:
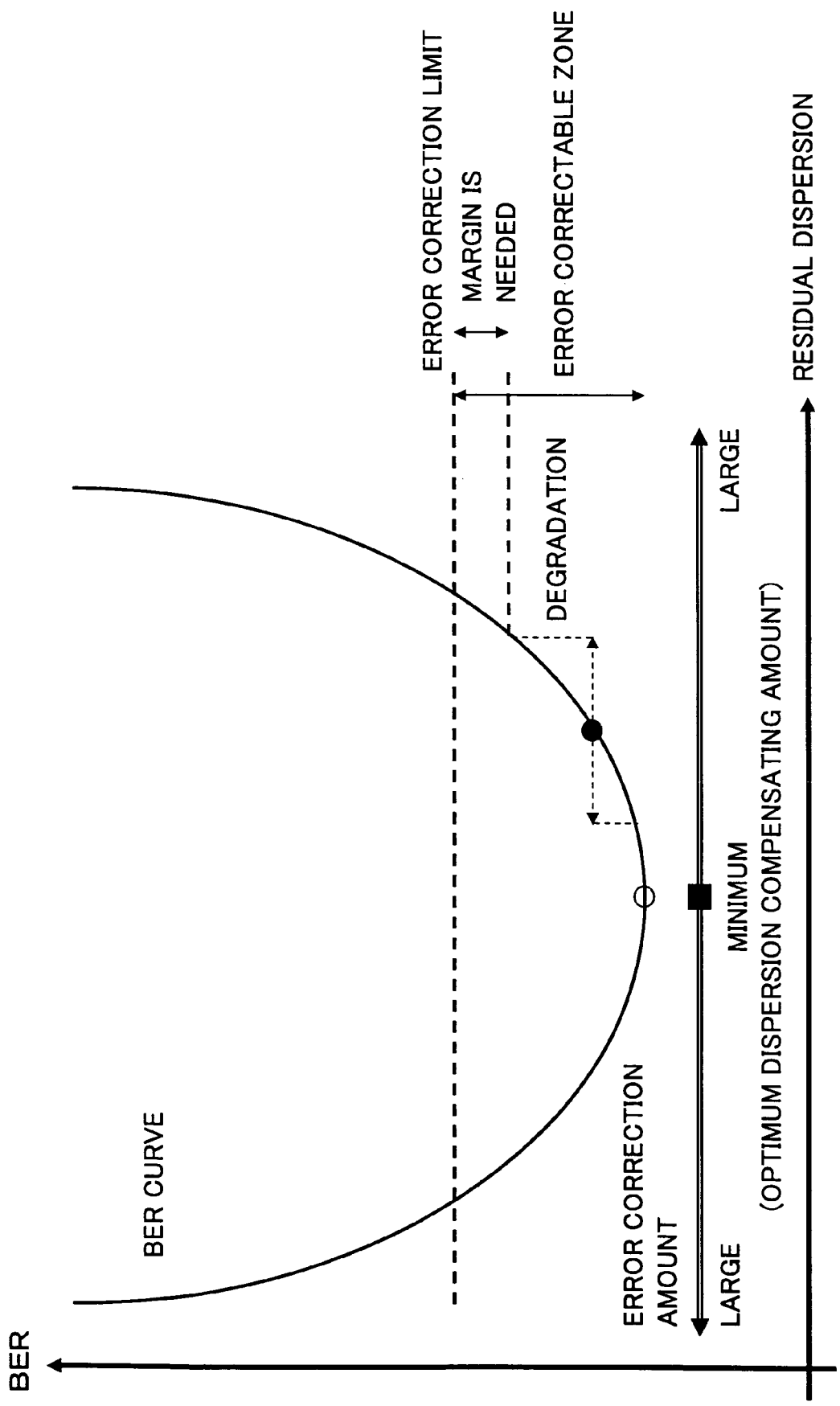
Figure 3:
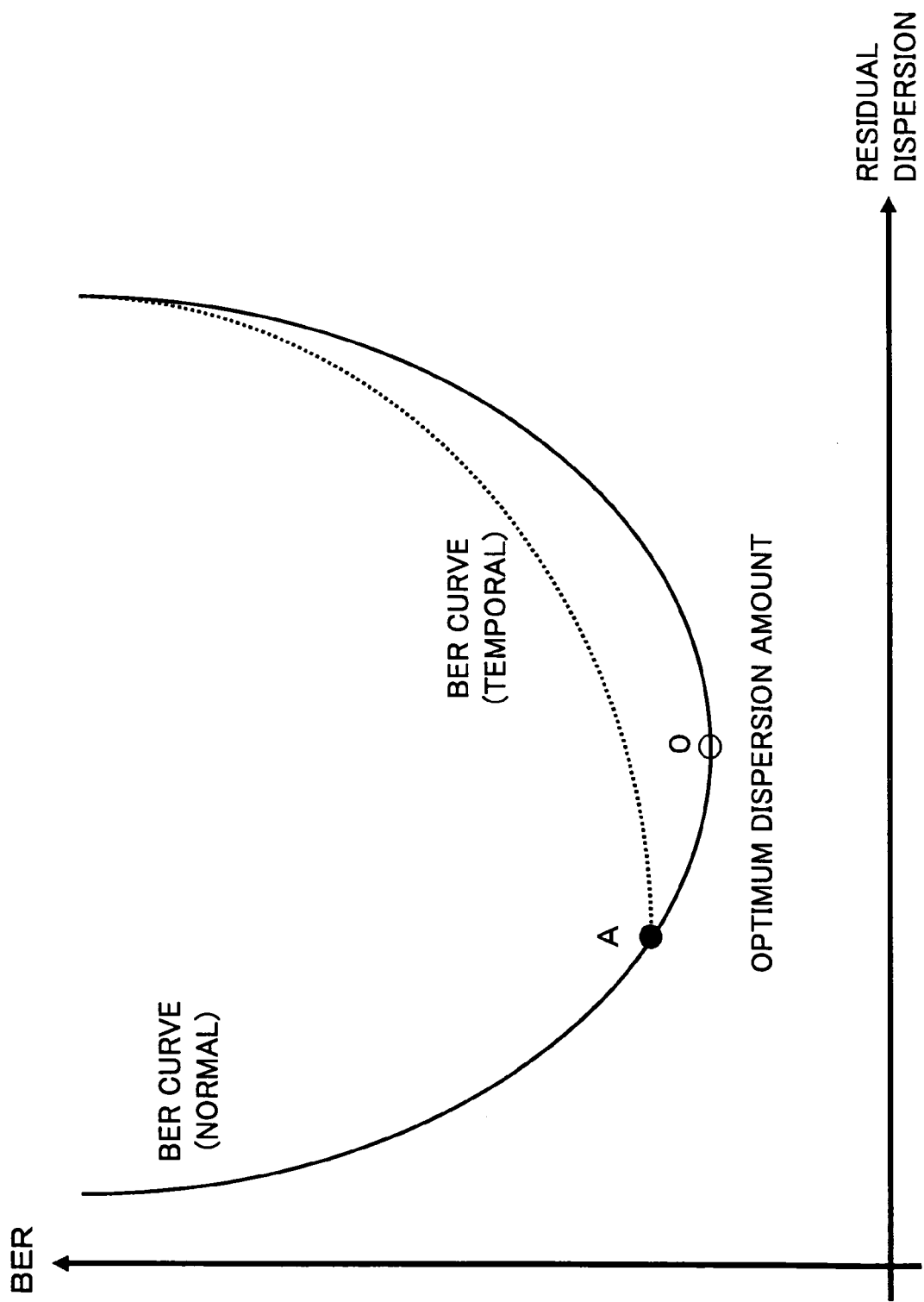
Figure 4:
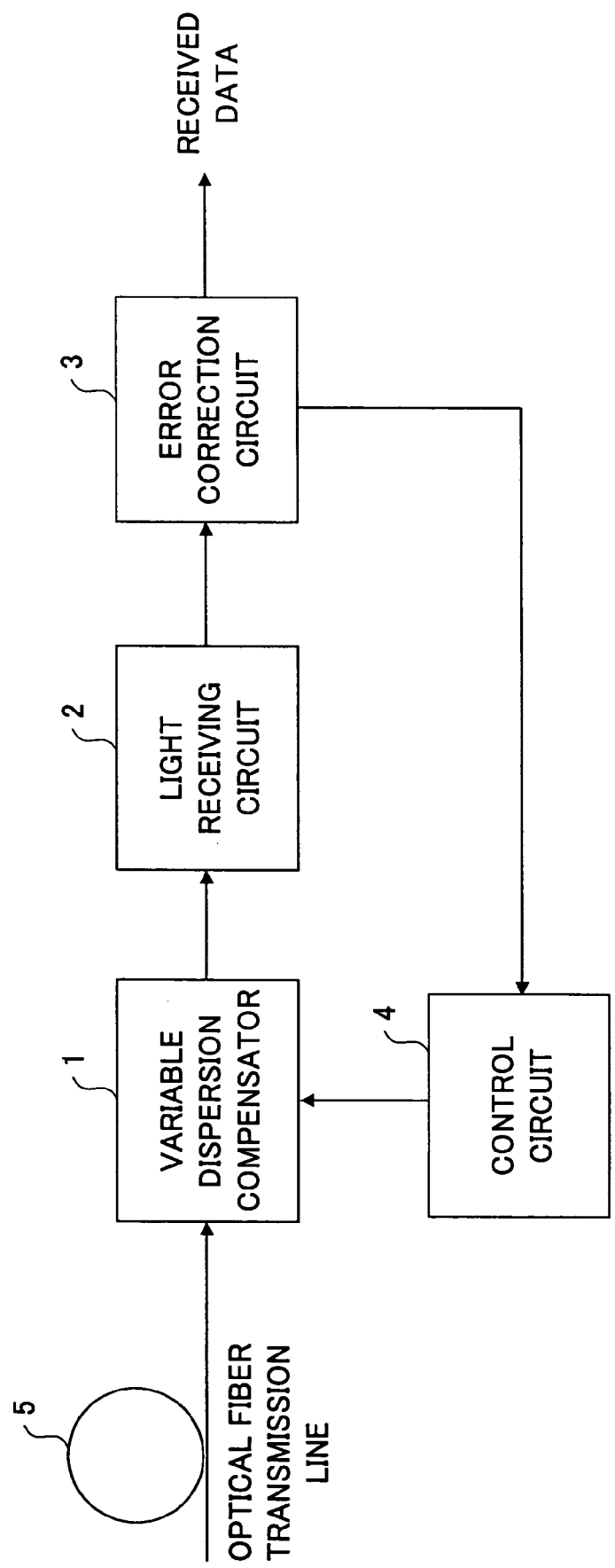
FIG. 4 shows a block diagram of a dispersion compensating apparatus in a first embodiment of the present invention.

FIG. 4 shows a block diagram of a configuration of a dispersion compensating apparatus in a first embodiment of the present invention. As shown, the dispersion compensating apparatus includes a variable dispersion compensator 1, a light receiving circuit 2, an error correction circuit 3 and a control circuit 4.

An optical signal supplied to the variable dispersion compensator 1 through an optical fiber transmission line 5 is an optical signal at a high bit rate of 40 Gb/s or such for example, in which waveform degradation may occur due to dispersion characteristics of the optical fiber transmission line 5. The variable dispersion compensator 1 is a well-known optical device which has a function of variably compensating wavelength dispersion which input light has. Specifically, for example, a VIPA (virtually imaged phased array) device, an optical device employing a FBG (fiber Bragg grating), or such may be applied thereto. This variable dispersion compensator 1 performs polarization dispersion compensation simultaneously as well as wavelength dispersion compensation simultaneously.

The light receiving circuit 2 receives the optical signal output from the variable dispersion compensator 1, converts it into an electric signal, performs well-known signal reception processing such as clock reproduction, data discrimination and so forth, and outputs a received data signal indicating the processing result, to the error correction circuit 3.

The error correction circuit 3 performs error correction with the use of error correction code included in the received data signal output from the light receiving circuit 2, obtains a code error rate such as BER (bit error rate) and error correcting contents, and provides the thus-obtained information to the control circuit 4 as code error information. As a specific manner of measuring the code error rate and error correction contents, a well-known manner may be applied, such as a manner of determining the code error by performing parity check on the received data signal, a manner of utilizing a B1 or a B2 byte in the signal conforming to the SONET or SDH standard, for example. Also, in a case where error correction code is applied to the optical signal, an error correction amount and error correction contents detected during the error correction processing are provided to the control circuit 4 as the code correction information.

The control circuit 4 performs automatic control of a wavelength dispersion compensating amount in the variable dispersion compensator 1 based on the code error information such as the code error rate and the error correction contents provided by the error correction circuit 3, such as to reduce the code error included in the optical signal output from the variable dispersion compensator 1.

Figure 5:
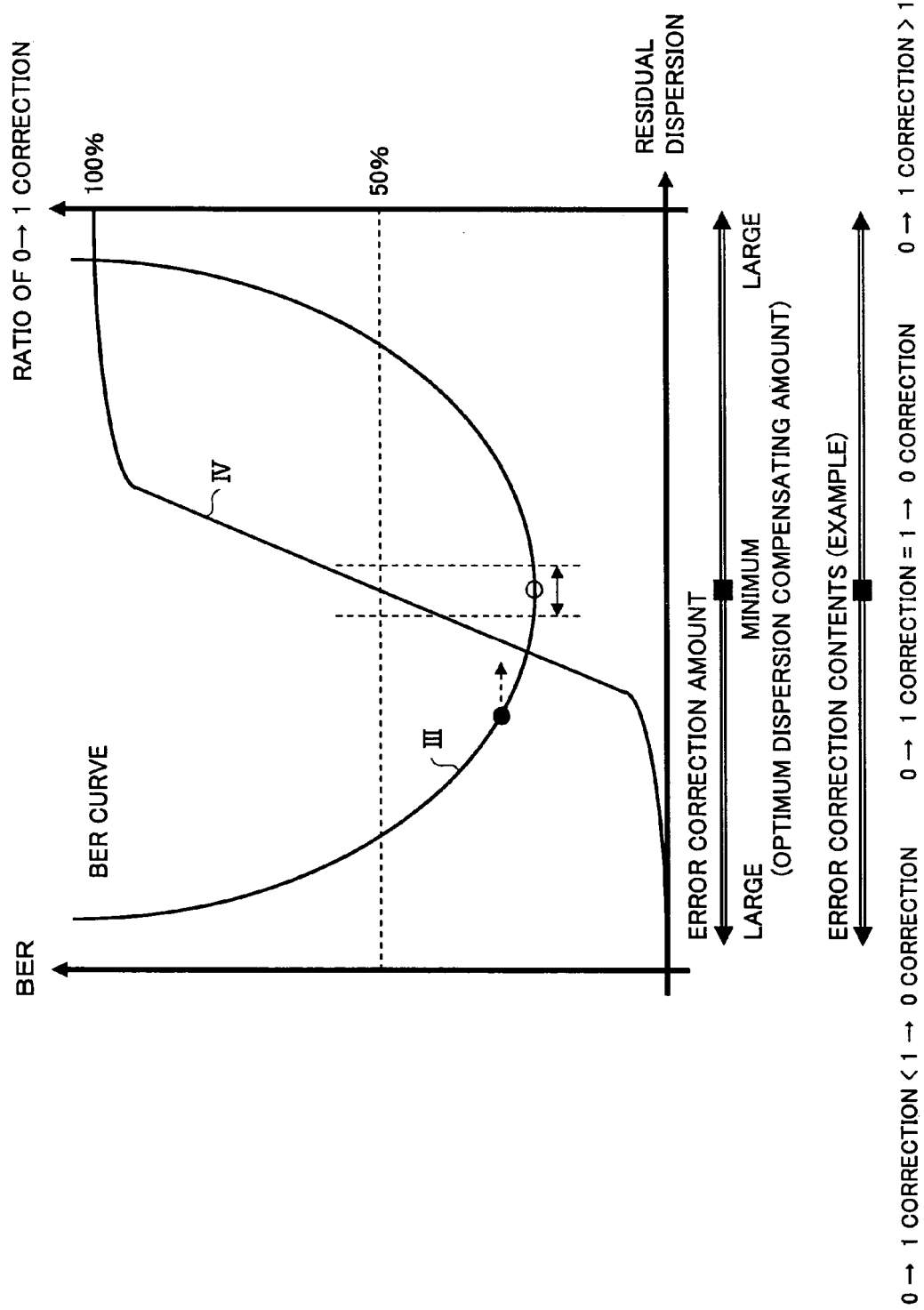
FIG. 5 illustrates dispersion compensating amount control according to the present invention.

As shown in FIG. 5, with respect to a BER curve III in which the BER increases as the residual dispersion amount goes away from a point of the optimum dispersion compensating amount (corresponding to a point at which BER is minimum), a correction ratio curve IV representing a ratio (called 'correction ratio from 0 to 1') of the number of corrected bits from 0 to 1 with respect to the sum total of the number of corrected bits from 0 to 1 and the number of corrected bits from 1 to 0 has characteristics such that the correction ratio from 0 to 1 has a value of approximately 50% at the point of the optimum dispersion compensating amount (corresponding to the point of the minimum BER), decreases as the residual dispersion becomes smaller and increases as the residual dispersion becomes larger.

Therefore, the control circuit 4 obtains the correction ratio from 0 to 1 based on the number of corrected bits from 0 to 1 and the number of corrected bits from 1 to 0, automatically controls the dispersion compensating amount in the variable dispersion compensator 1 in a direction such that the correction ratio from 0 to 1 may approach 50%, and thus, BER may become minimum.

In the above-described scheme, the automatic control of the variable dispersion compensator 1 is performed based on the correction ratio from 0 to 1, i.e., a/(a+b), where 'a' denotes the number of corrected bits from 0 to 1, and 'b' denotes the number of corrected bits from 1 to 0. However, it is also possible to instead apply a ratio of the number of erroneous bits of 0, i.e., a/(a+b), wherein 'a' denotes the number of erroneous bits of 0 (i.e., the number of erroneous bits each of which had the value '0') and 'b' denotes the number of erroneous bits of 1 (i.e., the number of erroneous bits each of which had the value '1').

In this case, the code error information provided by the error correction circuit 3 may include instead the code error rate and the number of erroneous bits of 0 and the number of erroneous bits of 1.

Since the above-mentioned (a+b) indicates the total number of the code errors, the code error rate (the number of errors occurring per unit time) can be easily calculated from this number by dividing the number with the relevant time interval.

Figure 6:
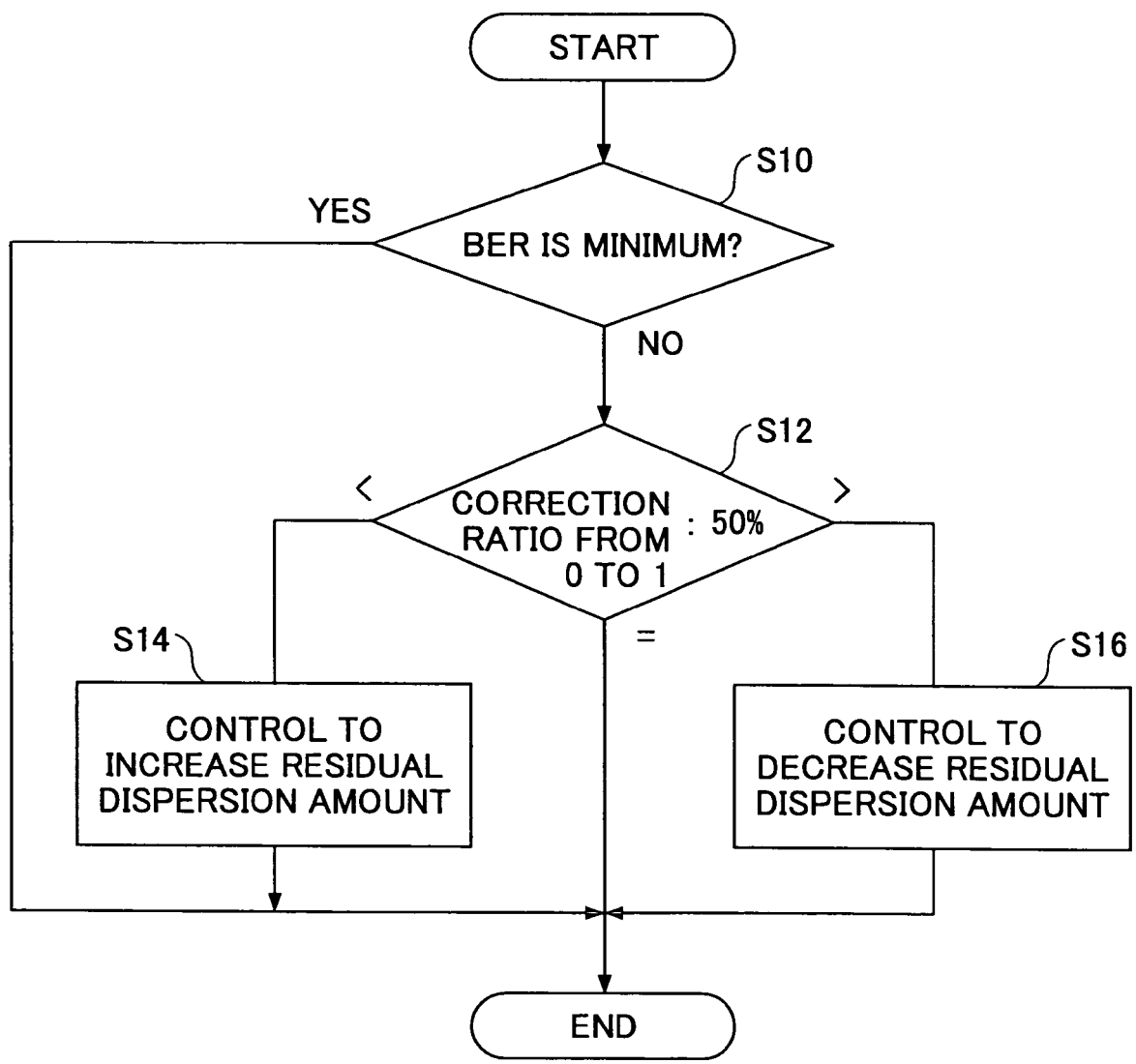
FIG. 6 shows a flow chart of dispersion compensation control processing executed by a control circuit in the first embodiment of the present invention.

FIG. 6 shows a flow chart of dispersion compensating control processing executed by the control part 4 according to the first embodiment of the present invention. This processing is repeated every predetermined time interval. First, in Step S10, it is determined whether or not the BER is the minimum value. When the BER is the minimum value, the current processing is finished. On the other hand, when the BER is not the minimum value, Step S12 is performed. In Step S12, it is determined whether the above-mentioned correction ratio from 0 to 1b is less than 50%, is just 50% or is more than 50%. When the correction ratio from 0 to 1 is less than 50%, the dispersion compensating amount in the variable dispersion compensator 1 is controlled in such a direction that the residual dispersion amount may increase, in Step S14. On the other hand, when the correction ratio from 0 to 1 is just 50%, the current processing is finished. When the correction ratio from 0 to 1 is more than 50%, the dispersion compensating amount in the variable dispersion compensator 1 is controlled in such a direction that the residual dispersion amount may decrease, in Step S16.

Instead of determining whether or not the BER is the minimum value in Step S10, it is also possible to determine whether or not the BER does not exceed a predetermined threshold. In this case, when the BER is less than the predetermined threshold, the current processing is finished, while, when the BER exceeds the threshold, the processing is proceeded with from Step S12. This alternative may also be applied to any other embodiment described below.

Thus, according to the first embodiment of the present invention, it is possible to determine, according to the correction ratio from 0 to 1, whether the dispersion compensation amount should be increased or decreased in response to deviation in the residual dispersion amount from the optimum amount. Thus, it is possible to avoid taking a risk of increasing in the BER in the dispersion compensating control processing.

Figure 7:
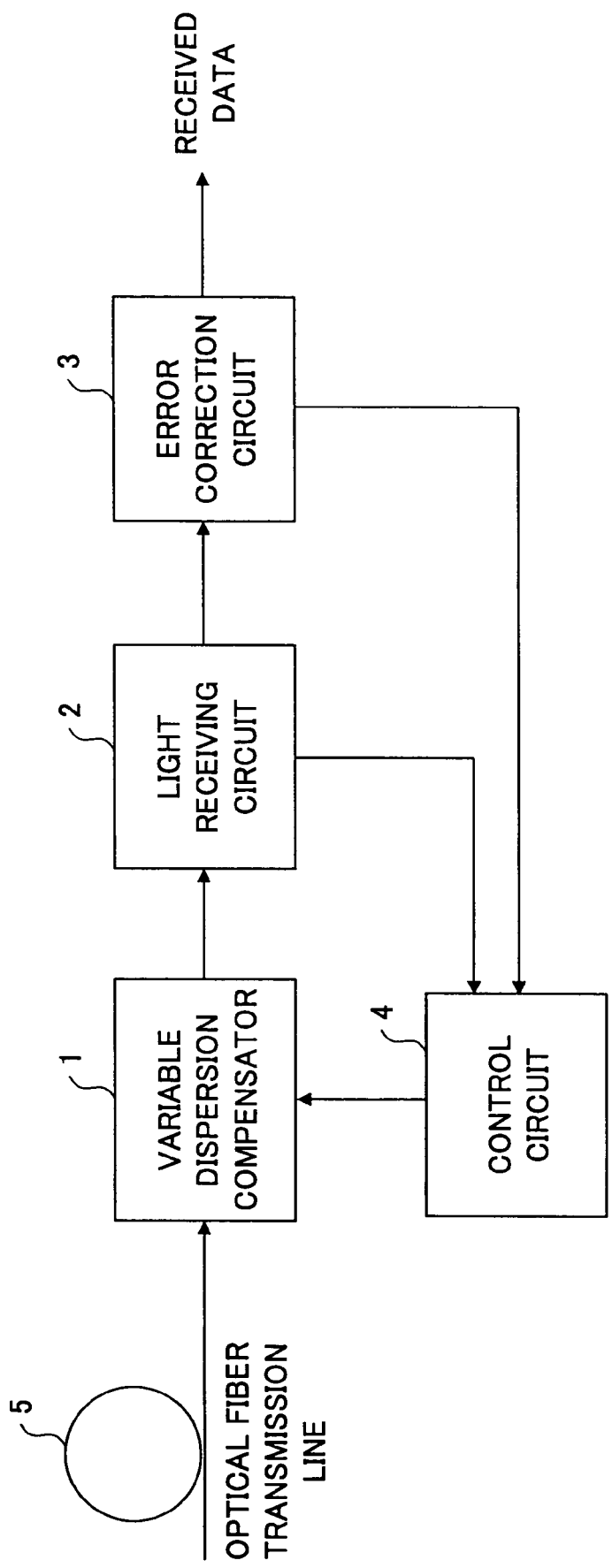
FIG. 7 shows a block diagram of a dispersion compensating apparatus in a second embodiment of the present invention.

FIG. 7 shows a block diagram of a dispersion compensating apparatus according to a second embodiment of the present invention. This embodiment is different from the embodiment shown in FIG. 4 in that OSNR (optical signal noise ratio) obtained in the optical receiving circuit 2 is supplied to the control circuit 4, which automatically controls the dispersion compensating amount in the variable dispersion compensator 1 according to the BER, the OSNR and the correction ratio from 0 to 1.

Figure 8:
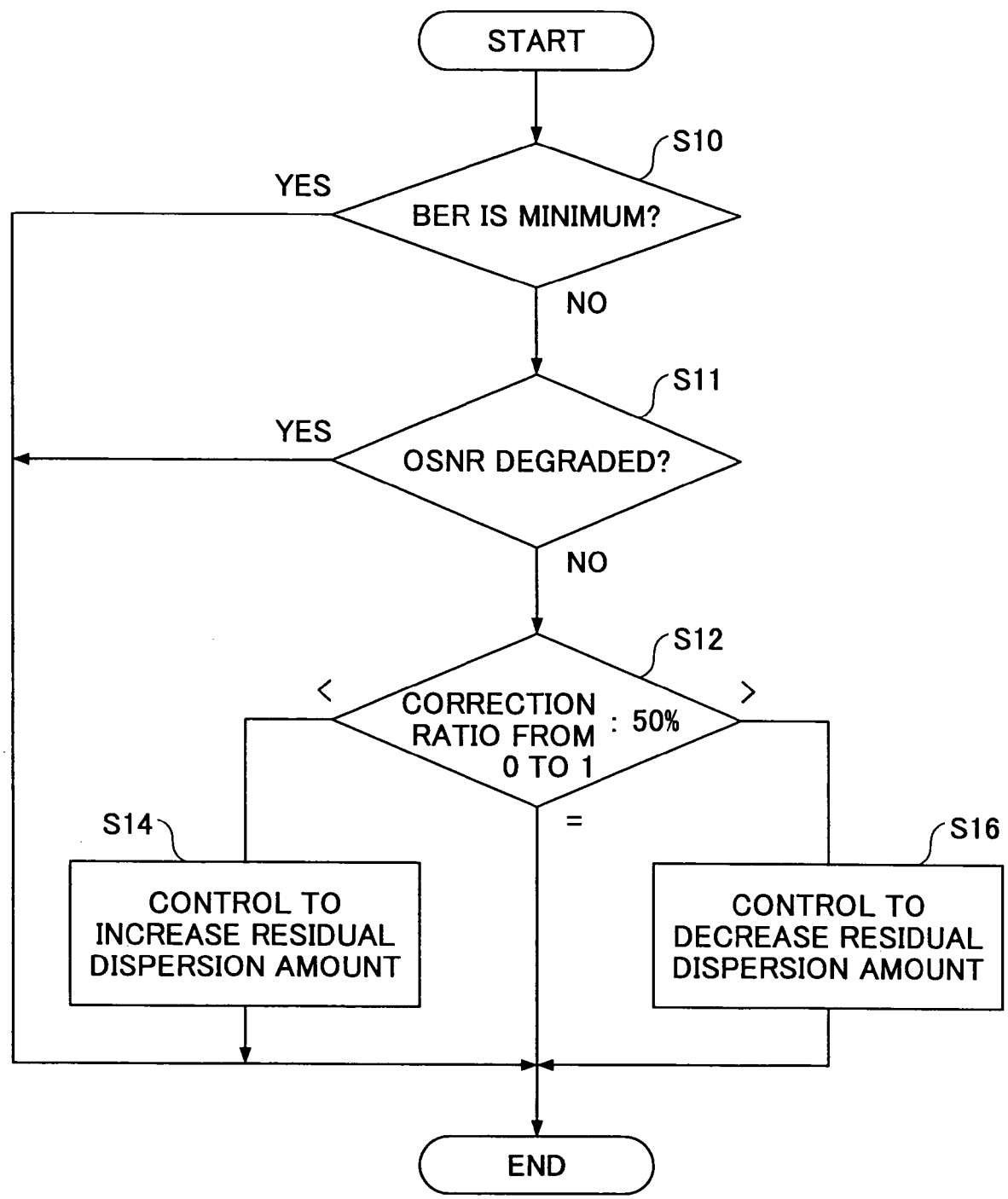
FIG. 8 shows a flow chart of dispersion compensation control processing executed by a control circuit in the second embodiment of the present invention.

FIG. 8 shows a flow chart of dispersion compensating control processing executed by the control part 4 according to the second embodiment of the present invention. This processing is repeated every predetermined time interval. First, in Step S10, it is determined whether or not the BER is the minimum value. When the BER is the minimum value, the current processing is finished. On the other hand, when the BER is not the minimum value, Step S11 is performed. In Step S11, it is determined whether or not the OSNR given is degraded from one given in the preceding processing. When the OSNR is degraded (Yes in Step S11), the current processing is finished. On the other hand, when the OSNR is not degraded (No in Step S11), Step S12 is performed.

In Step S12, it is determined whether the correction ratio from 0 to 1 is less than 50%, is just 50% or is more than 50%. When the correction ratio from 0 to 1 is less than 50%, the dispersion compensating amount in the variable dispersion compensator 1 is controlled in such a direction that the residual dispersion amount may increase, in Step S14. On the other hand, when the correction ratio from 0 to 1 is just 50%, the current processing is finished. When the correction ratio from 0 to 1 is more than 50%, the dispersion compensating amount in the variable dispersion compensator 1 is controlled in such a direction that the residual dispersion amount may decrease, in Step S16.

Thus, according to the second embodiment, the dispersion compensating control processing is stopped when the OSNR is degraded. Thereby, it is possible to avoid unnecessary dispersion compensating control in such a case where the OSNR temporarily changes and soon returns to the original state.

In other words, according to the second embodiment, control of the dispersion compensating amount can be retrained in a case of degradation of the BER based on temporary degradation of the OSNR.

Figure 9:
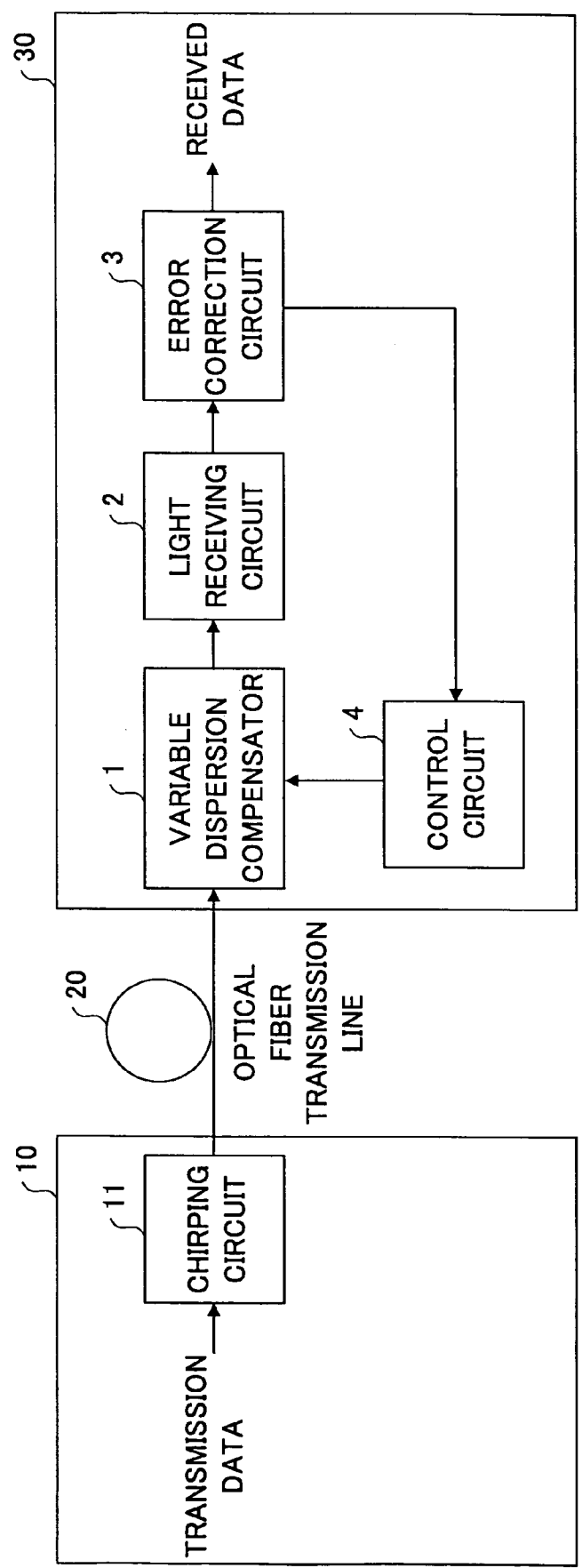
FIG. 9 shows a block diagram of one embodiment of an optical transmission system in which the present invention is applied.

FIG. 9 shows a block diagram of an optical transmission system in an embodiment of the present invention. As shown, an optical signal transmitted from an optical transmission apparatus 10 is transmitted to a light receiving apparatus 30 via an optical fiber transmission line 20.

The optical transmission apparatus 10 includes a chirping generation circuit 11 giving chirping to an optical transmission signal to be transmitted. Further, to the optical transmission signal, error correction code is also given. The optical fiber transmission line 20 provides wavelength dispersion to an optical signal transmitted thereby according to a type, a length or such of the optical fiber itself. In the optical fiber transmission line 20, an optical repeater, not shown, may be provided.

Figure 10:
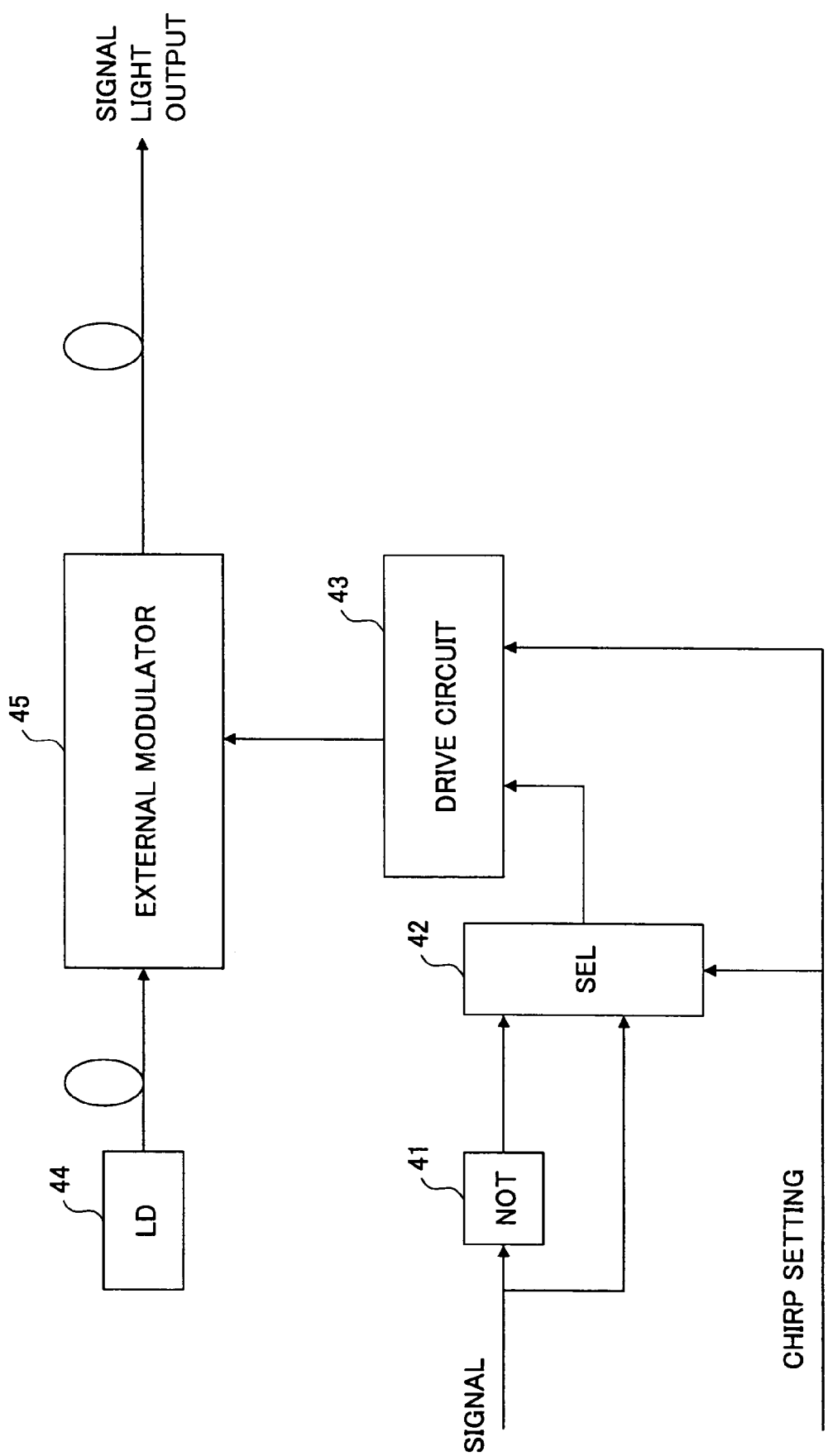
FIG. 10 shows a block diagram of one embodiment of a chirping generating circuit shown in FIG. 9.

FIG. 10 shows a block diagram of the above-mentioned chirping generation circuit 11 in one embodiment. Chirp setting shown means to change a frequency in a laser diode 44 by selecting an operation point in a driving circuit 43 in an external modulator 45 in the optical transmission apparatus 10 as a result of an electric current injected to a laser diode 44 being controlled thereby. The above-mentioned selection of the operation point is commonly expressed by a $\alpha$ parameter having the value of +1 or −1.

As shown in FIG. 10, a transmission signal is supplied directly to, or is supplied, after being inverted by a NOT circuit 41, to a selector 42. The selector 42 selects the given transmission signal directly supplied when the chirp setting given is $\alpha$ parameter=+1, while it selects the transmission signal supplied after being inverted when the chirp setting is $\alpha$ parameter=−1, and the thus-selected transmission signal is supplied to the drive circuit 43. The drive circuit 43 drives the external modulator 45 which modulates light output by the laser diode 44 with the thus-supplied transmission signal.

Figure 11:
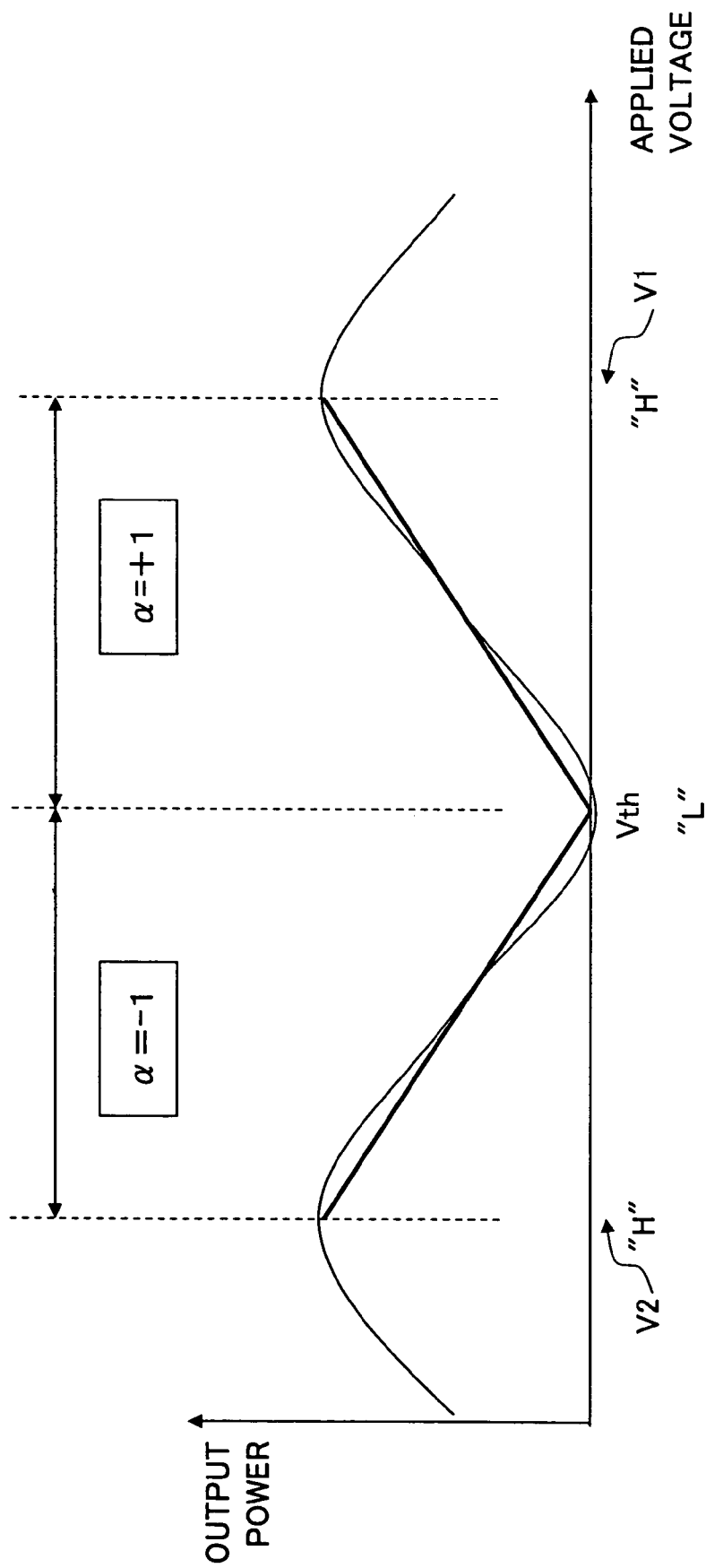
FIG. 11 illustrates operation of the chirping generating circuit.

The drive circuit 43 performs modulation driving of light output by the laser diode 44 in such a manner that, when the chirp setting is $\alpha$=+1, a reference potential Vth shown in FIG. 11 is treated as a low level (0) while a potential V1 higher than the reference potential Vth is treated as a high level (1). On the other hand, when the chirp setting is $\alpha$=−1, the modulation driving is performed such that the reference potential Vth shown in FIG. 11 is treated as a low level (0) while a potential V2 lower than the reference potential Vth is treated as a high level (1).

The optical receiving apparatus 30 employs the above-described dispersion compensating apparatus shown in FIG. 4. Which direction the residual desperation amount should be changed for the purpose of causing the correction ratio form 0 to 1 to approach 50% is determined from the chirp setting in the optical transmission apparatus 10.

Figure 12:
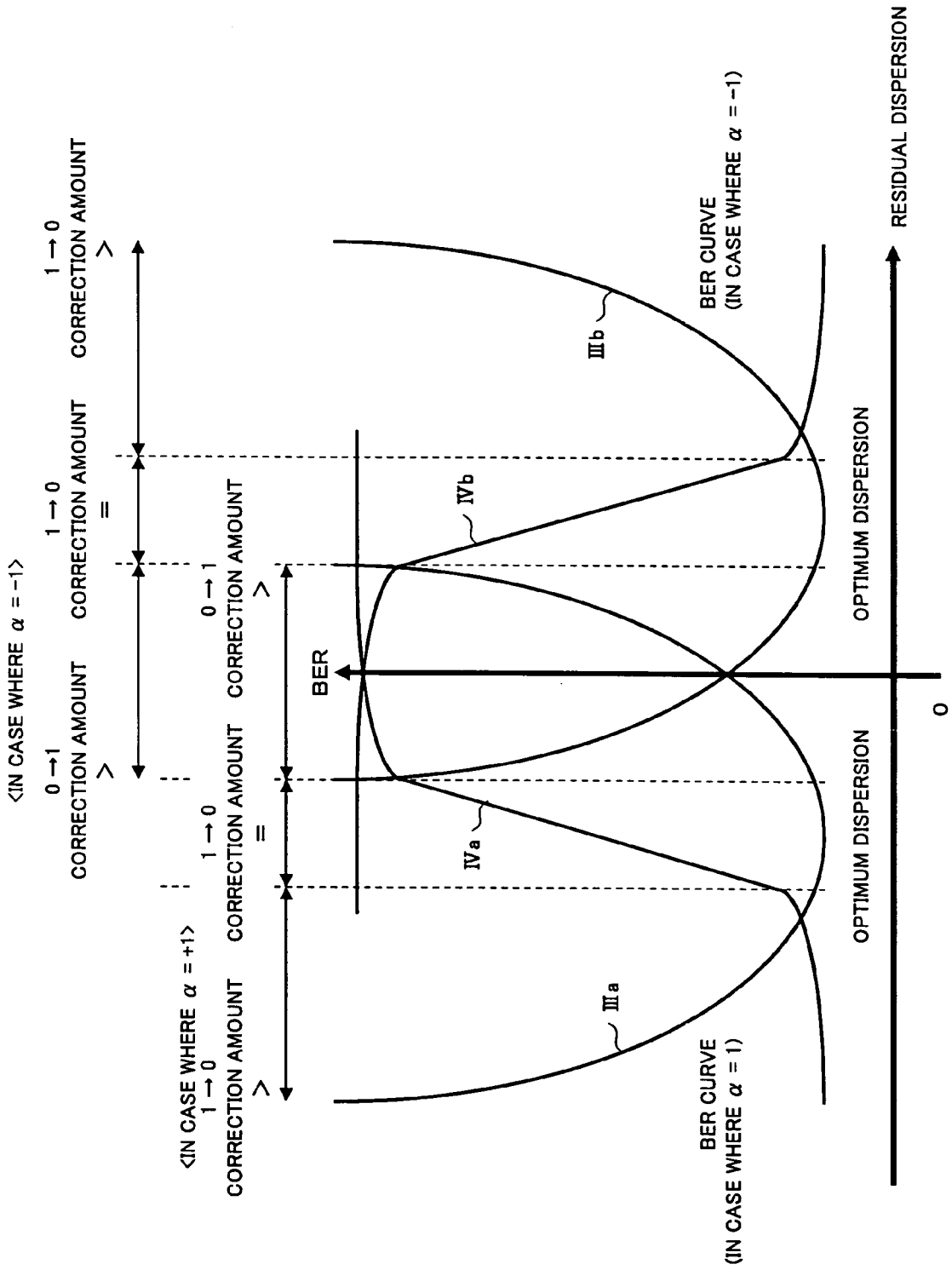
FIG. 12 shows a relationship between chirp setting, BER and correction ratio.

When the chirp setting in the optical transmission apparatus 10 is $\alpha$=+1, as shown in FIG. 12, with respect to a BER curve IIIa, a correction ratio curve IVa for the correction ratio from 0 to 1 is such that, approximately 50% is obtained at the optimum dispersion compensating amount; the value decreases therefrom as the residual dispersion becomes smaller; and the value increases therefrom as the residual dispersion become larger. On the other hand, when the chirp setting in the optical transmission apparatus 10 is $\alpha$=−1, as shown in FIG. 12, with respect to a BER curve IIIb, a correction ratio curve IVb for the correction ratio from 0 to 1 is such that, approximately 50% is obtained at the optimum dispersion compensating amount; the value increases therefrom as the residual dispersion becomes smaller; and the value decreases therefrom as the residual dispersion become larger.

Accordingly, when $\alpha$=+1, as described with reference to FIG. 6, the dispersion compensating amount in the variable dispersion compensator 1 is controlled in such a direction that the residual dispersion amount may increase when the correction ratio from 0 to 1 is less than 50%, while the dispersion compensating amount in the variable dispersion compensator 1 is controlled in such a direction that the residual dispersion amount may decrease when the correction ratio from 0 to 1 is more than 50%. On the other hand, conversely, when $\alpha$=−1, the dispersion compensating amount in the variable dispersion compensator 1 is controlled in such a direction that the residual dispersion amount may decrease when the correction ratio from 0 to 1 is less than 50%, while the dispersion compensating amount in the variable dispersion compensator 1 is controlled in such a direction that the residual dispersion amount may increase when the correction ratio from 0 to 1 is more than 50%.

Whether the chirp setting in the optical transmission apparatus 10 is $\alpha$=+1 or $\alpha$=−1 is normally recognized by the optical receiving apparatus 30. However, when the chirp setting in the optical transmission apparatus 10 is not recognized by the optical receiving apparatus 30, it is possible to determine whether the current chirp setting in the optical transmission apparatus 10 is $\alpha$=+1 or $\alpha$=−1 in the optical receiving apparatus 30, by the following operations: The dispersion compensating amount in the variable dispersion compensator 1 is changed, and then, change in the BER and the correction ratio from 0 to 1 occurring accordingly is monitored.

For example, in timing in which the system is first introduced, the configuration in the optical transmission apparatus 10 is changed or such, the optical receiving apparatus 30 may first determine the value in the chirp setting in the above-mentioned way, and, after that, according to the thus-determined value of the $\alpha$ parameter, either the above-mentioned operation for $\alpha$=+1 or the operation for $\alpha$=−1 should be performed.

Figure 13:
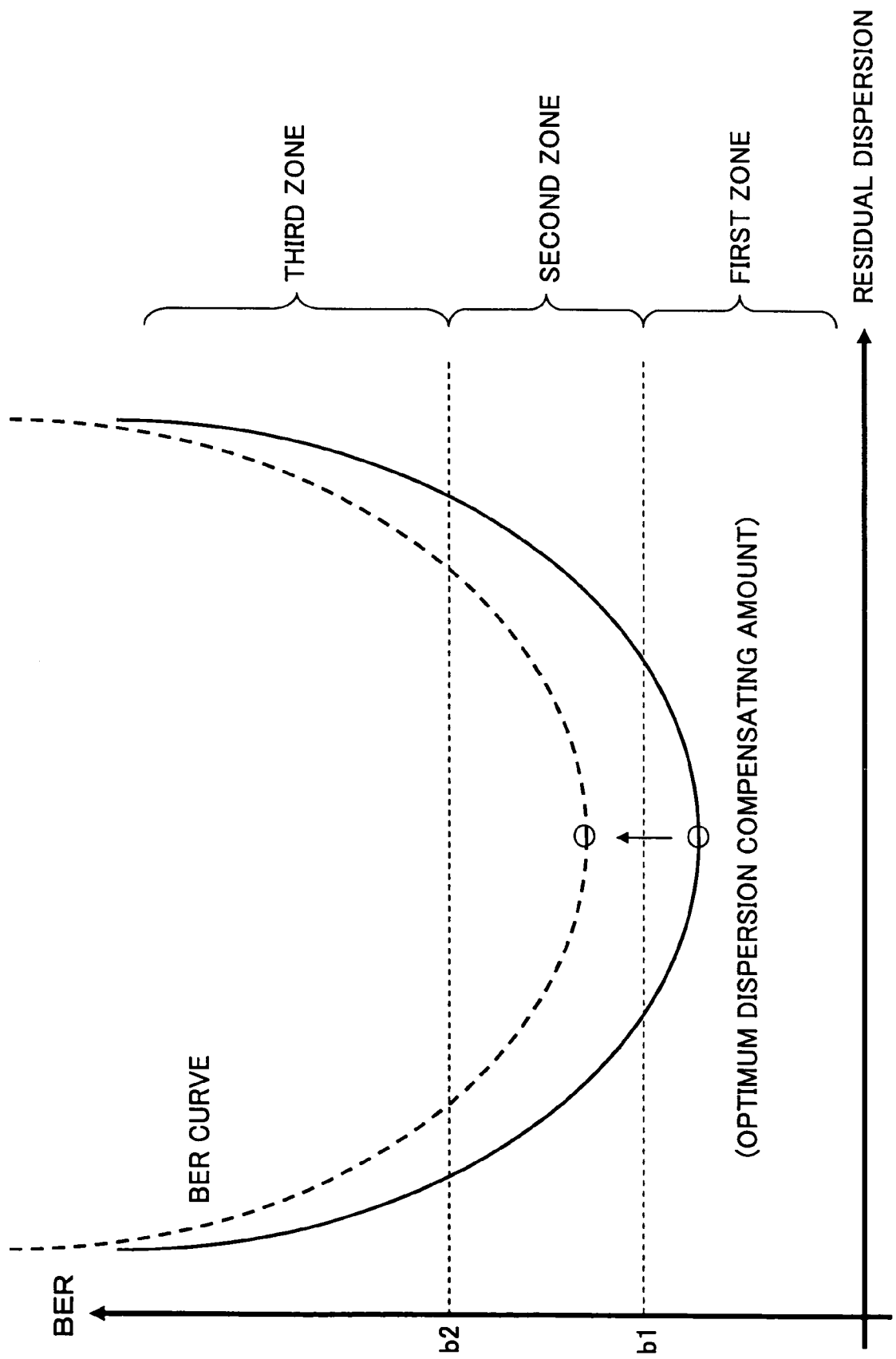
FIG. 13 illustrates a dispersion compensating apparatus in a third embodiment of the present invention.

In the BER curve represented by a solid line in FIG. 13, in a first zone in which the BER is less than a threshold 'b1', a very long time is required for optimizing the residual dispersion amount with the use of the correction amount from 0 to 1 since the number of error bits is small. In such a case, the time required for optimizing the residual dispersion amount can be reduced by intentionally increasing the number of error corrections with the use of a noise adding part provided.

Figure 14:
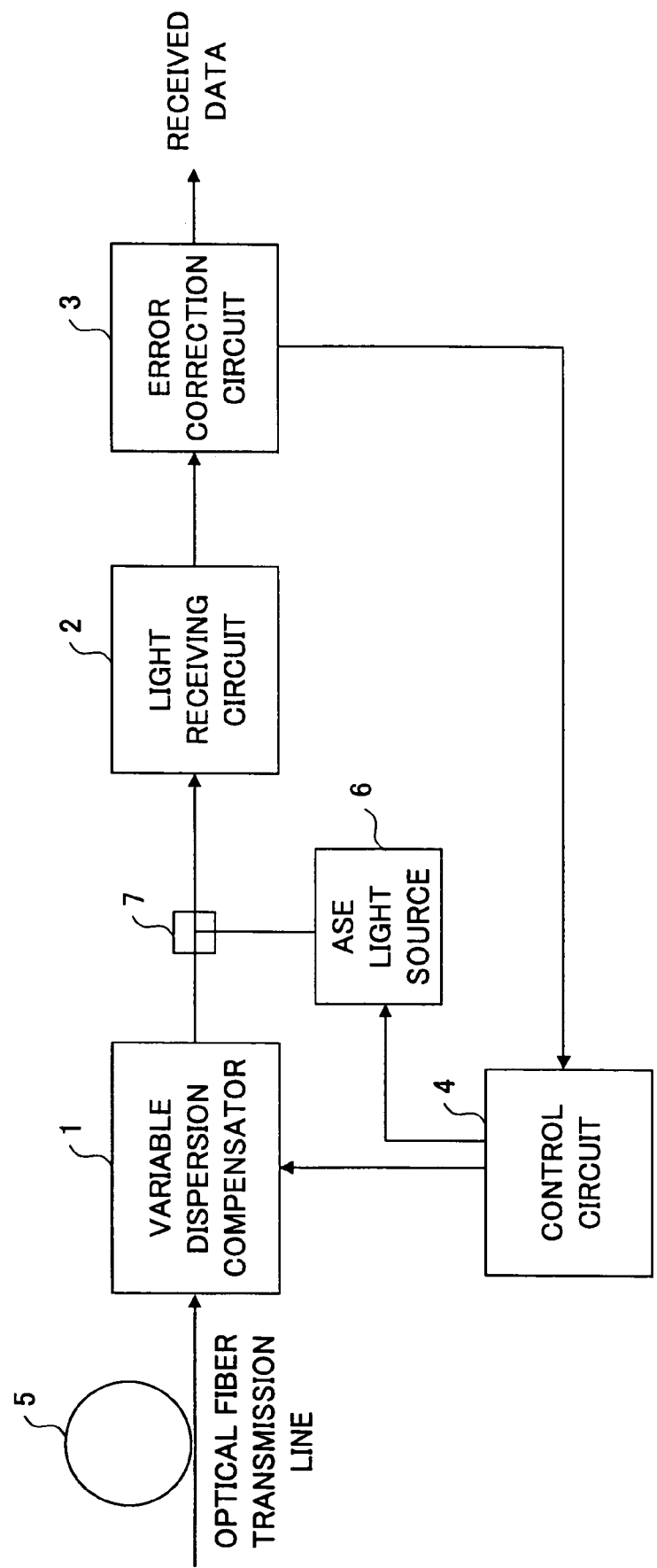
FIG. 14 shows a block diagram of a configuration of the dispersion compensating apparatus in the third embodiment of the present invention.

FIG. 14 shows a block diagram of a depression compensating apparatus according to a third embodiment of the present invention. The third embodiment is different from the embodiment shown in FIG. 4 in that an ASE light source 6 is provided. Only in a case where the BER is less than the above-mentioned threshold 'b1' supplied by the error correction circuit 3 as a code error rate, the ASE light source 6 is operated, and thereby, ASE (amplified spontaneous emission) light is generated thereby. The ASE light is then mixed by a multiplexer 7 to an optical signal output from the variable dispersion compensator 1.

Thereby, the OSNR is degraded, and, thereby, the BER curve is degraded into a BER curve represented by a broken line in FIG. 13 in which the BER at the optimum compensating amount is in a second zone, which is more than 'b1' but less than 'b2'. The second zone is such that the number of error corrected bits is large to a certain extent, but, is within a range in which error correction can be performed. By thus intentionally increasing the BER, since the number of error corrected bits increases accordingly, a time required for completing control operation shown in FIG. 6 for example can be effectively reduced. Thus, it is possible to reduce a time required for optimizing the residual dispersion amount.

Figure 15:
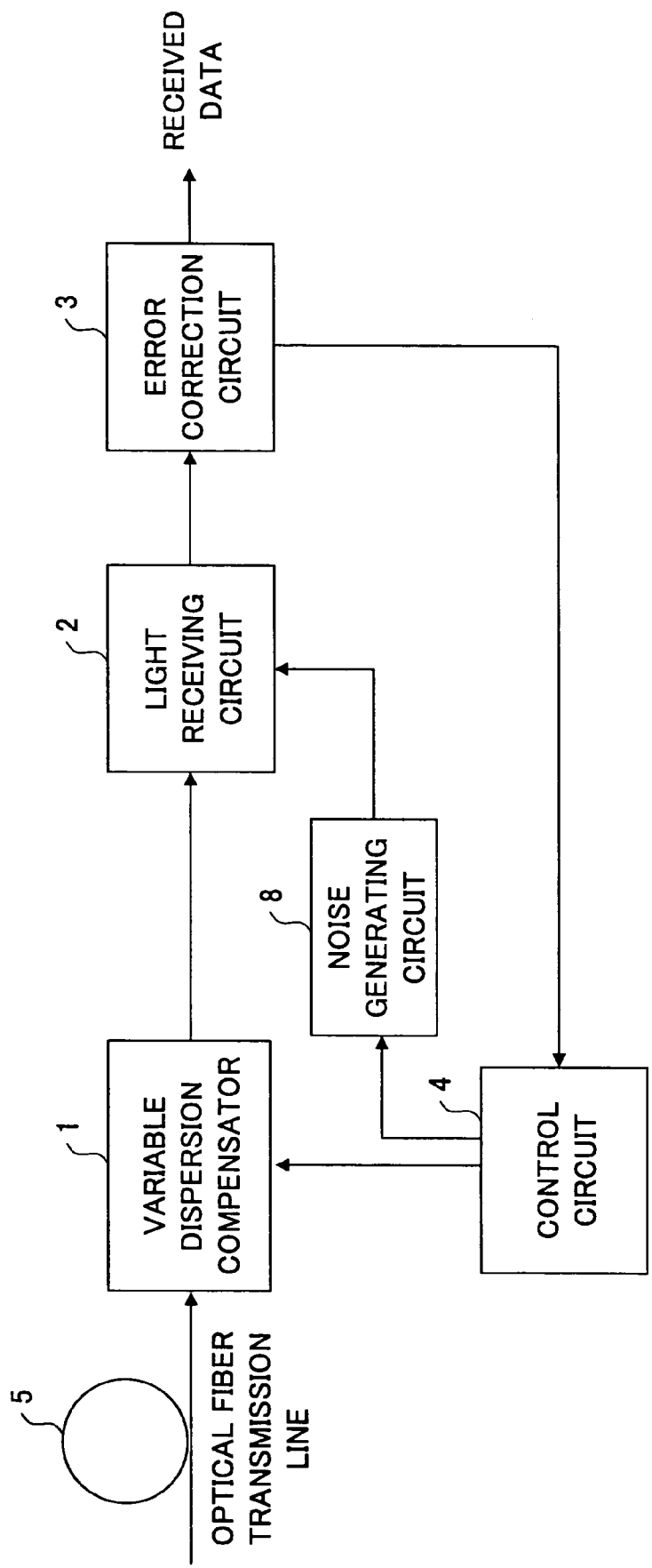
FIG. 15 shows a block diagram of a configuration of a dispersion compensating apparatus in a variant embodiment of the third embodiment of the present invention.

FIG. 15 shows a block diagram of a dispersion compensating apparatus according to a variant embodiment of the third embodiment of the present invention. In this variant embodiment, a noise generating circuit 8 is provided instead of the ASE light source 6. Only in a case where the BER is less than the above-mentioned threshold 'b1' supplied by the error correction circuit 3 as a code error rate, the noise generating circuit 8 is operated, and thereby, electrical white noise is generated thereby. The white noise is then supplied to the light receiving circuit 2, is mixed there to a received signal which has been already converted into an electrical signal there.

Thereby, the BER curve is degraded into a BER curve represented by a broken line in FIG. 13 in which the BER at the optimum compensating amount is in a second zone, which is more than b1 and less than b2. The second zone is such that the number of error corrected bits is large to a certain extent, but is within a range in which error correction can be performed. By thus intentionally increasing the BER, since the number of error corrected bits increases accordingly, a time required for completing control operation shown in FIG. 6 for example can be effectively reduced. Thus, it is possible to reduce a time required for optimizing the residual dispersion amount.

A case where it is not possible to intentionally increase the error correction amount by means of providing the noise adding part such as the ASE light source in the dispersion compensating arrangement (apparatus) itself is described next.

Figure 16:
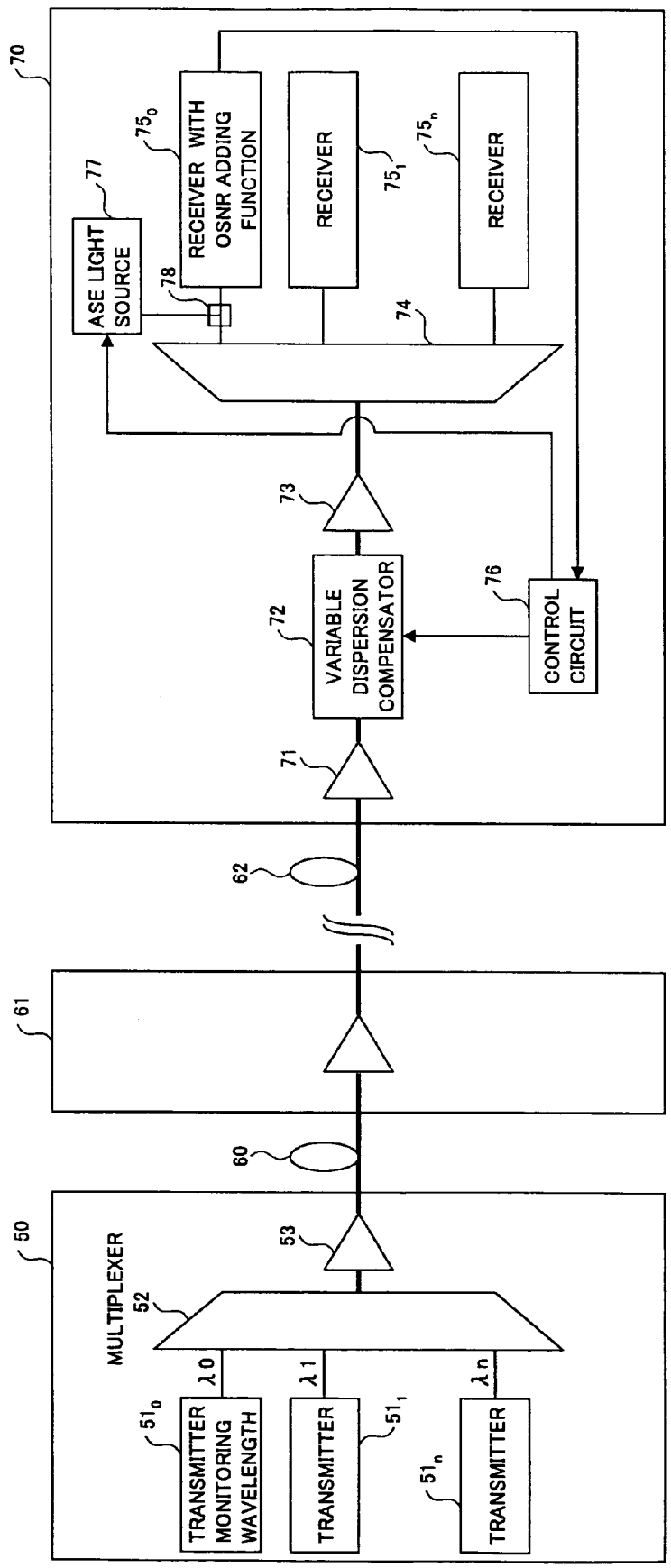
FIG. 16 shows a block diagram of one embodiment of a wavelength division multiplexing transmission system in which the present invention is applied.

FIG. 16 shows a block diagram of a wavelength division multiplexing transmission system in one embodiment of the present invention. As shown, a wavelength multiplexing transmission apparatus 50 at a transmission end includes transmitters $51_0$ through $51n$, a wavelength multiplexing part 52 and a transmission optical amplifier 53.

The transmitter $51_0$ generates an optical signal of a monitoring wavelength $\lambda 0$, and supplies it to the wavelength multiplexing part 52. The transmitters $51_1$ through $51n$ respectively convert given optical signals such as those of SONET (synchronous Optical Network), GbE (Gigabit Ethernet (registered trademark)) standard or such into respective optical signals of wavelengths $\lambda 1$ through $\lambda n$ different from each other in a narrow band for being subject to wavelength multiplexing, and supply them to the wavelength multiplexing part 52.

A wavelength multiplexed signal multiplexed in the wavelength multiplexing part 52 is amplified by the transmission optical amplifier 53, transmitted to an optical fiber transmission line 62, and thereby, is transmitted to a wavelength multiplexing transmission apparatus 70 at a receiving end.

The wavelength multiplexing apparatus 70 at the receiving end includes a receiving optical amplifier 71, a variable dispersion compensator 72, a receiving optical amplifier 73, a wavelength demultiplexing part 74, receivers $75_0$ through $75n$, a control circuit 76 and an ASE light source 77. The wavelength multiplexed signal received from the optical fiber transmission line 62 is amplified by the receiving amplifier 71, again amplified by the receiving amplifier 72 after passing through the variable dispersion compensator 72, is then supplied to the wavelength demultiplexer 74, and thus, is demultiplexed into respective optical signals of the wavelengths $\lambda 0$ through $\lambda n$.

The respective receivers $75_0$ through $75n$ receive the optical signals of the respective wavelengths, convert them into respective electrical signals, perform well-known receiving processing such as clock reproduction, data discrimination and so forth, and perform error correction on the thus-obtained received data signals. The receiver $75_0$ having the monitoring wavelength $\lambda 0$ obtains the BER and the error correction contents, and supplies the thus-obtained information to the control circuit 76.

The control circuit 76 performs automatic control of the wavelength dispersion compensating amount in the variable dispersion compensator 72, so as to reduce code error in the optical signal output from the variable dispersion compensator 72 based on the BER (code error rate) and the error correction contents supplied from the receiver $75_0$. Also, the control circuit 76 operates the ASE light source 77 which thus generates ASE light, the ASE light being then mixed in a multiplexer 78 to the optical signal in the monitoring wavelength $\lambda 0$ output from the wavelength demultiplexer 74, only when the BER supplied from the receiver $75_0$ is not more than 'b1' shown in FIG. 13.

Thereby, the BER curve represented by the solid line in FIG. 13 is degraded into the BER curve represented by the broken line, the number of error corrected bits increases in response to the degradation in the BER, and thus, the time required for optimizing the residual dispersion amount with the use of the correction ratio from 0 to 1 can be effectively reduced. In this configuration, since the ASE light is inserted thus only to the monitoring wavelength light, it is possible to perform control of the dispersion compensating amount without actually degrading the BER in the optical signals of any other wavelengths. It is also possible to apply a noise generating circuit such as that mentioned above instead of the ASE light source 77.

Furthermore, although the correction ratio from 0 to 1 is applied for determining a direction of increasing or decreasing the dispersion compensating amount in response to decrease in the BER, it is also possible to instead apply a ratio of corrected bits, i.e., a ratio of the number 'a' of erroneous bits of '0' with respect to the total sum of the above-mentioned number 'a' and the number 'b' of erroneous bits of '1', i.e., a/(a+b), such as that described above.

It is noted that the above-mentioned variable dispersion compensator 1 or 72 corresponds to a variable dispersion compensating part; the light receiving circuit 2 or the receiver $75_0$ corresponds to a light receiving part; the error correction circuit 5 or the receiver $75_0$ corresponds to an error correction part; the control circuit 4 or 76 corresponds to a control part; the ASE light source 6 or 77 and the multiplexer 7 or 78 correspond to an ASE light mixing part; and the noise generating circuit 8 corresponds to a noise mixing part.

Further, the present invention is not limited to the above-described embodiments, and variations and modifications may be made without departing from the basic concept of the present invention claimed below.

The present application is based on Japanese priority application No. 2004-093079, filed on Mar. 26, 2004, the entire contents of which are hereby incorporated by reference.

What is claimed is:

1. A dispersion compensating method, comprising:
performing dispersion compensation by causing an optical signal, supplied from an optical transmission line, to pass through a variable dispersion compensator;

receiving a data signal from the optical signal that passed through the variable dispersion compensator;

correcting bits of the received data signal and obtaining a code error information based on the corrected bits; and controlling a dispersion compensating amount in the variable dispersion compensator according to the code error information for a type of code in the received data signal, wherein the code error information comprises a ratio between the number of corrected bits from 0 to 1 and the number of corrected bits from 1 to 0.

2. A dispersion compensating apparatus, comprising:

a variable dispersion compensating part performing dispersion compensation of an optical signal, supplied from an optical transmission line, the variable dispersion compensator outputting a compensated optical signal;

a light receiving part receiving the compensated optical signal from the dispersion compensating part and obtaining a data signal from the received compensated optical signal;

an error correcting part performing error correction on the data signal obtained by the light receiving part and obtaining code error information for a type of corrected code in the data signal; and a control part controlling a dispersion compensating amount in the variable dispersion compensating part according to the code error information obtained by the error correcting part, wherein the code error information comprises the number of corrected bits from 0 to 1 and the number of corrected bits from 1 to 0, and said control part increases or decreases the dispersion compensating amount according to a correction ratio from 0 to 1, which is a ratio of the number of corrected bits from 0 to 1 with respect to the sum total of the number of corrected bits from 0 to 1 and the number of corrected bits from 1 to 0.

3. The dispersion compensating apparatus as claimed in claim 2, wherein:

said control part increases the dispersion compensating amount when the correction ratio from 0 to 1 is less than 50% while decreasing the dispersion compensating amount when the correction ratio from 0 to 1 exceeds 50% in a case where a chirp setting is $\alpha=+1$, said control part reversing the direction of increasing or decreasing the dispersion compensating amount when the chirp setting is $\alpha=-1$.

4. The dispersion compensating apparatus as claimed in claim 2, further comprising an ASE light mixing part mixing ASE light to the optical signal output by said variable dispersion compensating part when respective values of the number of corrected bits from 0 to 1 and the number of corrected bits from 1 to 0 are less than a predetermined threshold over a period of time.

5. The dispersion compensating apparatus as claimed in claim 2, further comprising a noise mixing part mixing noise to a signal obtained from photoelectric conversion of the optical signal in said light receiving part when respective values of the number of corrected bits from 0 to 1 and the number of corrected bits from 1 to 0 are less than a predetermined threshold over a period of time.

6. The dispersion compensating apparatus as claimed in claim 2, further comprising an ASE light mixing part mixing the ASE light to light in a monitoring wavelength separated from the optical signal output from said variable dispersion compensating part.

7. The dispersion compensating apparatus as claimed in claim 2, further comprising a noise mixing part mixing the noise to the signal obtained from photoelectric conversion of light of a monitoring wavelength, in said light receiving part, separated from the optical signal output from said variable dispersion compensating part.

8. An apparatus, comprising:

means for performing dispersion compensation by causing an optical signal, supplied from an optical transmission line, to pass through a variable dispersion compensator;

means for receiving a data signal from the optical signal that passed through the variable dispersion compensator;

means for correcting bits of the received data signal and obtaining code error information based on the corrected bits: and means for controlling a dispersion compensating amount in the variable dispersion compensator according to the code error information for a type of code in the received data signal, the code error information comprising a ratio between the number of corrected bits from 0 to 1 and the number of corrected bits from 1 to 0.

* * * * *

UNITED STATES PATENT AND TRADEMARK OFFICE
CERTIFICATE OF CORRECTION

PATENT NO. : 7,450,856 B2  Page 1 of 1
APPLICATION NO. : 10/885732
DATED : November 11, 2008
INVENTOR(S) : Masahiro Yoshimoto et al.

It is certified that error appears in the above-identified patent and that said Letters Patent is hereby corrected as shown below:

Column 12, Line 38, Claim 8 change "bits:" to --bits;--.

Signed and Sealed this

Sixteenth Day of March, 2010

David J. Kappos
*Director of the United States Patent and Trademark Office*